(No Model.)
H. MILLER.
LIFTING JACK.
No. 283,635. Patented Aug. 21, 1883.
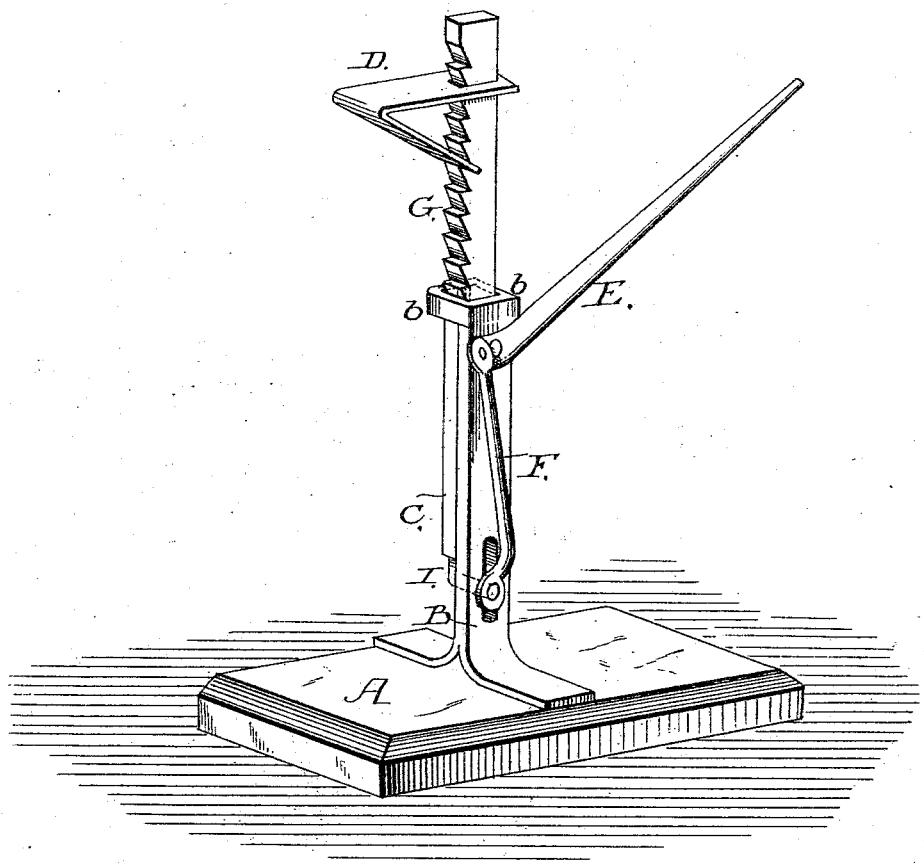
Attest:
Walter Fowler
H. B. Applewhaite
Inventor;
Henry Miller
by
A. N. Evans & Co
his Attys.

UNITED STATES PATENT OFFICE.

HENRY MILLER, OF GREELEY, COLORADO, ASSIGNOR TO THE MONITOR WORKS, OF BELOIT, WISCONSIN.

LIFTING-JACK.

SPECIFICATION forming part of Letters Patent No. 283,635, dated August 21, 1883.

Application filed March 27, 1883. (No model.)

*To all whom it may concern:*

Be it known that I, HENRY MILLER, of Greeley, in the county of Weld, State of Colorado, have invented a new and useful Improvement in Lifting-Jacks; and I do hereby declare the following to be a full, clear, and exact description of the same, reference being had to the accompanying drawing, making part of this specification, in which the figure is a perspective view of my improved lifting-jack.

My invention relates to improvements in wagon-jacks, by which an upright sliding bar with a projecting ratchet or attachment moves vertically or otherwise in an upright fixed slotted standard, and is worked by a connecting pitman and lever. It is an improvement on Patent No. 272,969, issued to me on February 27, 1883; and it consists of the combination of devices hereinafter explained and claimed.

To enable others skilled in the art to make and use my invention, I will proceed to describe the exact manner in which I have carried it out.

The frame-work of the machine is the base A, into which is fastened the upright fixed slotted standard B. To the standard B, which may be bifurcated, and each foot bolted to the base, is attached the upright sliding bar C by the lower end of the sliding bar being turned at right angles at the point I, so as to pass through the slot in the upright standard, and there secured by a burr, while the body of the bar C slides through the bent arms $b$, attached to the top of the standard B. To the upright sliding bar C is attached the adjustable angular bent plate D, which can be moved up and down by means of the notches or ratchet G in the sliding bar C.

The lever E and the pitman F are connected to the machine as follows: The lever E is fastened by a rivet to the upper portion of the upright fixed standard. The pitman F is fastened to the sliding bar C at its lower end after it has passed through the slot in the upright standard B, and there secured by a burr. The upper end of the pitman F is secured to the lever E by a rivet at the shorter end of the lever projecting from the standard B. The upright sliding bar C is held firmly in its place, and moving readily up and down along the upright standard B by means of the arms $b$, fixed to the upper portion of the upright standard B.

In the operation of the machine, it is placed under the wagon, vehicle, or any other article or body of any kind which is to be lifted. The lever is then raised. The adjustable attachment is then placed in position immediately under and pressing closely to the axle of the wagon or other vehicle, or the under side of any other article or body which is to be raised or lifted. The lever is then pressed down and the wagon or other vehicle or other article or body is raised or lifted to the required distance. When the lever E is thus pressed down to the required distance and beyond the dead-point, the upright sliding bar C is firmly held in place, and the raised or lifted wagon or other vehicle or other article or body is held in the raised or lifted position as long as may be required.

Having thus described my invention, what I claim as new, and desire to secure by Letters Patent, is—

In a lifting-jack, the standard B, slotted near its base, and the bent sliding bar C, provided with a ratchet, G, in combination with the pitman F, lever E, and adjustable bent plate D, all constructed substantially as and for the purpose set forth.

HENRY MILLER.

Witnesses:
LUTHER S. KAUFFMAN,
M. H. KAUFFMAN.